April 17, 1956 H. M. MUNCHERYAN 2,742,630
REMINDER TO DISCONNECT VEHICLE LIGHTS
Filed Oct. 12, 1953

INVENTOR.
Harut M. Muncheryan

United States Patent Office 2,742,630
Patented Apr. 17, 1956

2,742,630

REMINDER TO DISCONNECT VEHICLE LIGHTS

Hrand M. Muncheryan, Duarte, Calif.

Application October 12, 1953, Serial No. 385,348

2 Claims. (Cl. 340—52)

The present invention relates to signal devices and more particularly to an automobile alarm signal device which automatically produces a buzzing signal when any of the automobile lights is left on unintentionally after parking the car.

A principal object of this invention is to provide a signaling device which can readily be mounted in the lighting circuit of any conventional automobile for warning the driver against leaving any of the automobile lights turned on after parking.

A further object of the invention is to provide an automobile signalling device which gives an audible signal, when the automobile lights are left on unintentionally, upon the driver's opening the door for leaving the car after parking.

A still further object of the invention is to construct the device of a simple design which is inexpensive to manufacture and operate, compact and small in size, and is positive in its performance.

Figure 1:
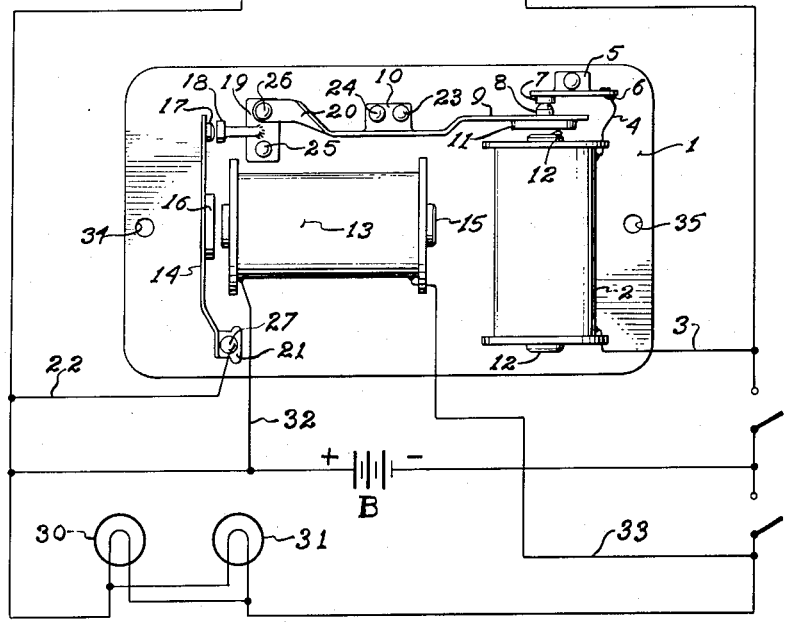
Figure 2:
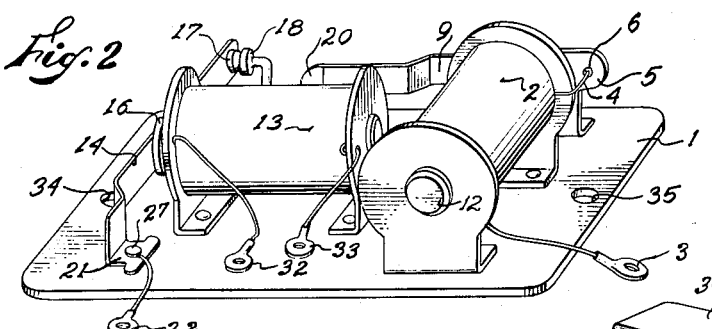
Figure 3:
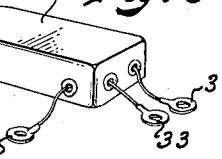
Figure 6:
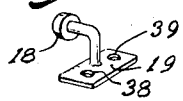
Figure 4:
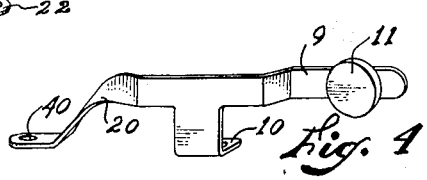
Figure 7:
Figure 5:

Other objects and advantages will be made manifest in the following specification taken in conjunction with the accompanying drawing, in which like numerals designate corresponding parts throughout the several views, and wherein:

Figure 1 is the top view of the present invention, with its cover removed to show the arrangement of the various functional parts, and the schematic diagram of an automobile lighting circuit in which the device is electrically connected, Figure 2 is the side view of the invention in elevation, with the cover removed, Figure 3 is the general view of the device in elevation, showing the connection leads emerging from various apertures located in the cover enclosing the entire mechanism of the device, Figure 4 is the view in elevation of the armature of the buzzer mechanism, Figure 5 is the view in elevation of the armature of the electrical relay mechanism, Figure 6 is the electrical contact bus between the buzzer and the relay armature, and Figure 7 is the contactor relaying the current between the buzzer armature and the buzzer solenoid coil.

Referring now to the drawing, numeral 1 designates the base plate, which is made of a nonconducting material, such as plastic, hard rubber, composition material, or any other suitable substance. On this plate are mounted a buzzer solenoid 2, one end 3 of whose coil is connected through a switch $S_1$ to the car's battery designated by the letter B, and the other end 4 is connected to the supporting link 5 at point 6 of the armature contactor 7, which electrically negotiates at contact point 8 of the buzzer armature 9 made of a resilient metal such as hardened copper or brass. The buzzer armature 9 is integral with an L-shaped support 10. Adjacent to the free terminal end of the buzzer armature 9 and on the opposite side of the contact point 8 is a temporarily magnetizable disc 11 which is made of a high-permeability material such as soft iron. A soft-iron core 12 extends axially along the entire length of the solenoid 2; this core is capable of becoming magnetized when current passes through the coil of the solenoid 2 and of becoming demagnetized when the current flow is interrupted.

A second solenoid 13 together with its armature 14 is employed as a relay for turning on and off the current to the buzzer solenoid 2. When a current passes through the solenoid 13, the soft-iron core 15 becomes magnetized and pulls the magnetized disc 16, secured to the armature 14, toward it; by this means, the electrical contact point 17 near the terminal portion of armature 14 makes a contact with the contact bus 18 and transfers the current from the armature 14 through the contact bus support 19 and the arm 20 to the armature 9. Since the armature 9 is made of a resilient electric-conducting material, and by virtue of its spring action it is in contact at all times with contact point 7 and therefore the current from the armature 9 passes through contact point 7 and the coil 4 to the solenoid 2, magnetizing the core 12. The magnetization of the core 12 causes the magnetic disc 11 to be pulled to the core 12, breaking the electrical contact between the contact points 7 and 8 and interrupting the current flow to the solenoid 2. This action immediately demagnetizes the core 12, and the armature 9 again causes a contact between the points 7 and 8, and the current again flows through the solenoid. The process continues as long as the current is furnished from the battery B, so that the armature disc 11 vibrates back and forth between the contact point 7 and the core 12 and produces a buzzing sound.

When the current to the solenoid 13 is cut off, the armature 14 springs back and breaks the electrical contact between the contact points 17 and 18. Thus no current can flow to the solenoid 2 as long as the armature is in this position. The armature 14 is integral with the plate 21 which provides a support and secures the armature on the base plate 2. The numeral 22 designates the armature terminal lead which is connected to one side of the battery B as shown.

The L-shaped support 10 of armature 9 is secured to the base plate by means of the rivets 23 and 24; the bus support 19 is secured to the base plate by rivets 25 and 26; and, the plate 21 is secured by means of the rivet 27. The numerals 28 and 29 represent the entire lighting system (with no regard to the exact number of lights) of a conventional automobile, and 30 and 31 represent the door-switch operated interior lights of the automobile. The switch $S_1$ turns on or turns off the headlights or parking-lights, and $S_2$ represents the automatic switch of the door-operated lights. For installing the device on an automobile, the lead 22 and the lead 32 are connected to one terminal (for instance, to the positive terminal) of the battery B; the lead 3 is connected through the headlight switch $S_1$ to the negative terminal of the battery, and the lead 33 is connected through the doorlight switch $S_2$ to the negative terminal of the battery, as shown in Figure 1. The device is secured to any suitable part of the automobile by means of sheet-metal screws (or bolts) inserted through the apertures 34 and 35. The cover 36 snaps over the periphery of the base plate 1 and remains secured thereto; this cover may be removed when desired by prying off with a screwdriver. The apertures 37, 38, 39, 40, and 41 are the rivet holes of the respective parts as shown in the figures.

After the signalling device is installed on the automobile, as described above, it operates as follows: The switch $S_1$ being the headlight switch, when the car lights are on, this switch is in closed position. If all the doors of the car are closed, the signalling device is not in operation. After the car is parked and if any of the car lights in the headlight circuit is not turned off, the signalling device will give a buzzing alarm as the driver opens the car door to leave. When the car door is open the switch S₂ is closed and the door-operated lights 30 and 31 are on, as well as the circuit to the solenoid 13 being closed, thus causing an interrupted current to flow through the buzzer solenoid 2. The buzzing of the device signals the driver to turn off his car lights. When the lights are turned off the buzzing alarm stops, even if the car door is still open, since the switch S₁ is now open and no current flows through the alarm system consisting of the solenoid 2, the buzzer armature 9, and the interconnecting leads and contacts. The entire lighting and signalling system receives current from the conventional car battery B, as shown in Figure 1.

I have shown and described the principal features of my invention in the foregoing specification and drawing; however, I may make modifications and changes in the various constructions embodied hereof without departing from the spirit and scope of the invention. Moreover, while I have signified the use of this alarm signalling device on automobiles, I reserve the right to employ the device on other systems, such as food-canning machines, all types of automatic packaging machines, etc., in which the car-lighting system shown in the drawing can be replaced by electrical rotating system and the switch S₂ will then represent a safety trip switch which will turn on the alarm when an unusual mechanical performance or a danger to human life is indicated.

I claim:

1. An automatic alarm-signalling device, comprising a base plate and two electromagnetic solenoids anchored on said plate with their long axes placed at right angles to each other, one of said solenoids having one end of its coil adapted to be connected through a switch to a source of current in the electric headlight system of an automobile and the other end to a contactor on said base plate, said contactor being in abutting relation with a magnetizable end of a resilient armature spacedly disposed adjacent said solenoid and secured to said plate at the opposite end forming thereupon a second electric contactor; the second of said two solenoids being adapted to be connected through a second switch located in the automobile door-light circuit and being nonoperative when said first switch is closed but being operative when said second switch is closed, a resilient armature with a magnetizable means thereon being disposed opposite to said second solenoid and secured at one end to said base plate and at its opposite end having a contact bus disposed adjacent said second electric contactor with an airgap therebetween, whereby when said first switch to the headlight is closed and said automobile door is opened said second switch closes the door-light circuit, energizing said second solenoid, which in turn attracts said second armature and establishes an electric circuit in said first solenoid, causing said first armature thereof to oscillate and produce an audible alarm signal; a housing adapted to enclose said solenoids, together with said armatures, being secured to said base, and apertures disposed in said housing with electric terminals leading therethrough for connection to the electric lighting circuit of an automobile.

2. An automotive alarm signalling device, comprising a base plate, an electromagnetic coil with a soft iron core therethrough secured on said plate, one end of said coil being connected through a first switch to a source of current supplying the headlight system of an automobile and the other end to a first electric contact member secured to said base, a vibratory electric armature provided at its midsection with an L-shaped support secured to said base and a magnetizable disc at one end being disposed between said soft iron core with an airgap therebetween and said contact member and resiliently bearing thereupon, the opposite end of said armature being connected to a second electric contactor on said base; a second electromagnet secured to said base and at right angles to said first electromagnet and adapted to be connected through a second switch to the automobile door-light circuit supplied by said current source, a second armature supported at one end on said base plate and having at its midsection a magnetizable disc disposed opposite said second electromagnet with an airgap therebetween, the opposite end of said armature being provided with a contact bus confronting said second electric contactor and normally separated therefrom by an airgap, whereby upon closing said first switch to turn on the headlights no current passes through either electromagnet thereof, but upon closing said second switch by the opening of the automobile door a current flows through said second electromagnetic coil whose core becomes magnetized and attracts said second armature, establishing an electric contact between said bus and said second contactor and causing a current to flow from said headlight circuit, through said second armature, to said first armature and through said first electromagnetic coil, whereby inciting said first armature to oscillate and produce an audible alarm signal until one of said switches is opened; said electromagnetic coils, said armatures, and said electric contactors being enclosed in a housing perforated by apertures and electric terminals from said electromagnets emerging therethrough; said terminals being adapted to be connected to the automobile lighting circuit as hereinabove described.

References Cited in the file of this patent

UNITED STATES PATENTS

| | | |
|---|---|---|
| 1,605,653 | Driscole | Nov. 2, 1926 |
| 1,958,964 | Franco | May 15, 1934 |
| 2,101,407 | Morland | Dec. 7, 1937 |
| 2,349,740 | McCollum | May 23, 1944 |
| 2,507,398 | Castro | May 9, 1950 |
| 2,613,258 | Azano | Oct. 7, 1952 |
| 2,688,129 | Nielsen | Aug. 31, 1954 |